United States Patent Office 3,462,706
Patented Aug. 19, 1969

3,462,706
SATURABLE ABSORBER LASER Q-SWITCH
James William Ammons, Paul Bernard Mauer, George A. Reynolds, and James A. Van Allan, Rochester, N.Y., assignors to Eastman Kodak Company, Rochester, N.Y., a corporation of New Jersey
No Drawing. Filed Sept. 27, 1965, Ser. No. 490,655
Int. Cl. H01s 3/11
U.S. Cl. 331—94.5
5 Claims This invention relates to laser Q-switching. More specifically, this invention relates to the use of certain pyrylium, cyanine-like saturable absorbers as Q-switches for lasers having an output at a wavelength of about 1.06 microns.

Since at least 1961 it has been known that a giant laser pulse can be generated if lasing can be suppressed during pumping of a laser rod until an unusually high population inversion is built up. If the suppressing factor is then eliminated, the laser will suddenly lase with a much larger power than usual. This procedure has become known as "Q-switching"; see British Patent 953,721 and R. W. Hellworth in Advances in Quantum Electronics edited by J. R. Singer, Columbia University Press, 1961.

More recently it has been suggestet that a saturable absorber could be used as an automatic Q-switch; see P. P. Sorokin, et al., "Ruby Laser Q-Switching Elements Using Phthalocyanine Molecules in Solution," IBM Journal, April 1964, P. Kafalas, et al., Journal of Applied Physics, August 1964, vol. 35, No. 8, p. 2349. In this process a saturable dye with an absorption peak at the wavelength of laser output is put in the path between the reflectors of a laser, thereby absorbing any output of the laser and preventing lasing until pumping builds up a large population inversion. At a point above the ordinary (non Q-switch) threshold of the laser the beginning of lasing action saturates the dye making it transparent and allowing lasing in one giant burst. Without the dye the laser would have lased at a lower condition of population inversion with less peak power. Q-switching enables higher peak power lasing than previously obtainable from the same equipment. The use of saturable absorbers allows this switching to be done automatically.

For proper Q-switching a dye must have not only a peak of absorption at the wavelength of laser output but a sufficiently quick saturation time to become transparent quickly enough to allow uninhibited lasing. If repetitive lasing is desired, stability from permanent bleaching is also a highly desirable characteristic.

A number of saturable absorbers have been developed which have a peak of absorption around 1.06 microns, the output wavelength for a neodymium-doped laser. A fair number of these dyes will Q-switch such a neodymium laser. Unfortunately, the long chains typical of the formulas for such absorbers are easily broken down under radiation, including both ordinary radiation and that involved in laser pumping. Because of these problems, it has not thus far been possible without complete laser testing to predict that a particular dye will function extremely well as a Q-switch.

It is an object of this invention to provide a Q-switch of the saturable absorber type for a laser emitting at a wavelength around 1.06 microns, which Q-switch will give a large uninhibited giant pulse.

It is a further object of this invention to provide a Q-switch of the saturable absorber type which Q-switch can be reused a large number of times without a large amount of permanent bleaching.

Both of these objects are accomplished by using one or more of certain pyrylium, cyanine-like dyes as such saturable absorber. The formulation and process of making such dyes will be more specifically set out in the examples below.

The following examples show three types of pyrylium dyes which, when used in the manner described below, have been highly successful in Q-switching neodymium-doped lasers with little or no permanent bleaching.

Example 1.—8 - [5 - (6,7 - dihydro - 2,4 - diphenyl - 5H-1 - benzopyran - 8 - yl) - 2,4 - pentadienylidene] - 5,6,7,8 - tetrahydro - 2,4 - diphenyl - 1 - benzopyrylium perchlorate

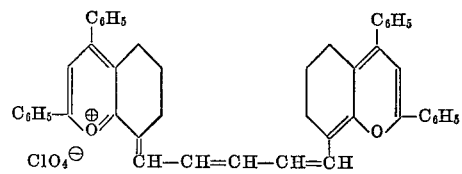

This compound was prepared as follows: A mixture of 3.9 g. of 2,4-diphenyl-5,6,7,8-tetrahydrobenzo[b] pyrylium perchlorate, 1.4 g. of glutaconaldehyde dianil hydrochloride, 0.8 g. of sodium acetate and 100 ml. of acetic anhydride was refluxed for ten minutes. After chilling, the solid was collected and mixed with boiling acetonitrile. The resulting hot mixture was filtered to yield 2.4 g. of the desired compound as a brown solid melting at 260° C.

Analysis.—Calcd. for $C_{47}H_{39}ClO_6$: C, 76.9; H, 5.3; Cl, 4.8. Found: C, 76.8; H, 5.2; Cl, 4.8.

Example 2.—8 - [5 - (6,7 - dihydro - 6 - methyl - 2,4 - diphenyl - 5H - 1 - benzopyran - 8 - yl) - 2,4 - pentadienylidene] - 5,6,7,8 - tetrahydro - 6 - methyl - 2,4-diphenyl-1-benzopyrylium perchlorate

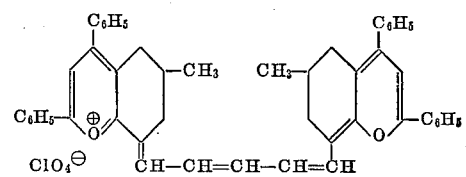

This compound was prepared as follows: A mixture of 4.0 g. of 2,4-diphenyl-6-methyl-5,6,7,8-tetrahydrobenzopyrylium perchlorate, 1.4 g. of glutaconaldehyde dianil hydrochloride, 0.8 g. of sodium acetate and 100 ml. of acetic anhydride was refluxed for ten minutes, chilled, and the solid reaction product was collected and mixed with boiling acetonitrile. The hot mixture was filtered to yield the desired compound as a brown solid melting at 241–243° C.

Analysis.—Calcd. for $C_{49}H_{42}ClO_6$: C, 77.1; H, 5.7; Cl, 4.6. Found: C, 77.1; H, 6.0; Cl, 4.6.

Example 3.—8 - {5 - [2,4 - di(4 - pentyloxyphenyl) - 6,7-dihydro - 5H - 1 - benzopyran - 8 - yl ] - 2,4 - pentadienylidene} - 2,4 - di(4 - pentyloxyphenyl) - 5,6,7,8-tetrahydro-1-benzopyrylium perchlorate

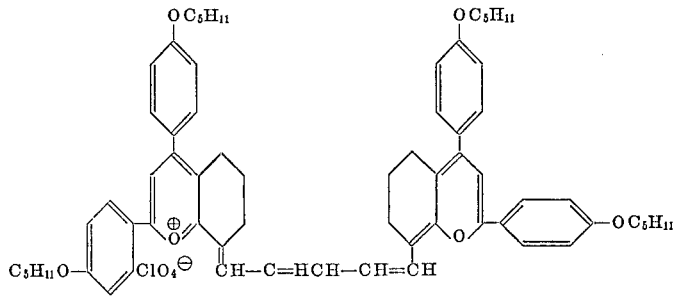

This compound was prepared as follows: A mixture of 5.58 g. of 2,4-di(4-pentyloxyphenyl)-5,6,7,8-tetrahydrobenzopyrylium perchlorate, 1.4 g. of glutaconaldehyde dianil hydrochloride, 0.8 g. of sodium acetate and 100 ml. of acetic anhydride was refluxed for ten minutes, chilled, and the solid collected and extracted with boiling acetonitrile. Filtration of the hot mixture yielded the desired compound which melts at 200–201° C.

*Analysis.*—Calcd. for $C_{67}H_{79}ClO_{10}$: C, 74.6, H, 7.3. Found: C, 74.2; H, 7.0.

In the above examples the compounds are given as perchlorates. It should be understood that the cation may be combined with the anion of any strong acid making, for example, a fluoroborate, chloride, bromide, fluoride, sulfate, chloroaluminate, chloroferrate, or p-toluenesulfonate.

For use as a Q-switch the above dyes should be dissolved in a suitable solvent and placed in the closed optical path of the laser. Excellent results were obtained, for example, when a 1 mg. per liter solution of each of the above dyes in chlorobenzine was placed between the end of a neodymium-doped silicate glass laser rod and one of two end reflectors. With a 1 cm. thick solution of the dye and a 3 inch by ¼ inch laser rod a 50 nanosecond pulse with a peak power of as high as 1 megawatt was obtained. These results compare favorably with other Q-switching devices such as rotating mirrors, Kerr cell arrangements, etc.

Obviously other solvents can be used with varied concentrations and occupying a different amount of the closed optical path.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. In a passively Q-switched laser utilizing a saturable absorber as the passive Q-switch, the improvement wherein said saturable absorber is a compound formed by the anion of a strong acid and one of the following cations:
    (1) 8 - [5 - (6,7 - dihydro - 2,4 - diphenyl - 5H - 1-benzopyran - 8 - yl) - 2,4 - pentadienylidene] - 5,6,7,8-tetrahydro-2,4-diphenyl-1-benzopyrylium+
    (2) 8 - [5 - (6,7 - dihydro - 6 - methyl - 2,4 - diphenyl-5H - 1 - benzopyran - 8 - yl) - 2,4 - pentadienylidene] 5,6,7,8 - tetrahydro - 6 - methyl - 2,4 - diphenyl - 1-benzopyrylium+
    (3) 8 - {5 - [2,4 - di(4 - pentyloxyphenyl) - 6,7 - dihydro - 5H - 1 - benzopyran - 8 - yl] - 2,4 - pentadienylidene} - 2,4, - di(4 - pentyloxyphenyl) - 5,6,7,8-tetrahydro-1-benzopyrylium+.

2. In a passively Q-switched laser utilizing a saturable absorber as the passive Q-switch, the improvement wherein said saturable absorber is a compound formed by the anion of a strong acid and 8-[5-(6,7-dihydro-2,4-diphenyl - 5H - 1 - benzopyran - 8 - yl) - 2,4 - pentadienylidene] - 5,6,7,8 - tetrahydro - 2,4 - diphenyl - 1 - benzopyrylium+.

3. In a passively Q-switched laser utilizing a saturable absorber as the passive Q-switch, the improvement wherein said saturable absorber is a compound formed by the anion of a strong acid and 8-[5-(6,7-dihydro-6-methyl-2,4 - diphenyl - 5H - 1 - benzopyran - 8 - yl) - 2,4 - pentadienylidene] - 5,6,7,8 - tetrahydro - 6 - methyl - 2,4 - diphenyl-1-benzopyrylium+.

4. In a passively Q-switched laser utilizing a saturable absorber as the passive Q-switch, the improvement wherein said saturable absorber is a compound formed by the anion of a strong acid and 8-{5-[2,4-di-(4-pentyloxyphenyl) - 6,7 - dihydro - 5H - 1 - benzopyran - 8 - yl] - 2,4-pentadienylidene} - 2,4 - di(4 - pentyloxyphenyl] - 5,6,7,8-tetrahydro-1-benzopyrylium+.

5. In a passively Q-switched laser utilizing a saturable absorber as the passive Q-switch, the improvement wherein said laser is of the type having an output of wavelength about 1.06 microns and said saturable absorber is a compound composed of the anion of a strong acid and one of the following cations:
    (1) 8 - [5 - (6,7 - dihydro - 2,4 - diphenyl - 5H - 1-benzopyran - 8 - yl) - 2,4 - pentadienylidene] - 5,6,7,8-tetrahydro-2,4-diphenyl-1-benzopyrylium+
    (2) 8-[5 - (6,7 - dihydro - 6 - methyl - 2,4 - diphenyl-5H - 1 - benzopyran - 8 - yl) - 2,4 - pentadienylidene] 5,6,7,8 - tetrahydro - 6 - methyl - 2,4 - diphenyl - 1-benzopyrylium+
    (3) 8 - {5 - [2,4 - di(4 - pentyloxyphenyl) - 6,7 - dihydro - 5H - 1 - benzopyran - 8 - yl] - 2,4 - pentadienylidene} - 2,4 - di(4 - pentyloxyphenyl) - 5,6,7,8-tetrahydro-1-benzopyrylium+.

References Cited
UNITED STATES PATENTS

| | | | |
|---|---|---|---|
| 3,270,291 | 8/1966 | Kosonocky | 331—94.5 |
| 3,365,678 | 1/1968 | Maurer | 331—94.5 |

JEWELL H. PEDERSEN, Primary Examiner

WILLIAM L. SIKES, Assistant Examiner

U.S. Cl. X.R.
350—160